United States Patent

[11] 3,540,594

[72] Inventor Joseph D. Sanderson
   Orinda, California
[21] Appl. No. 567,547
[22] Filed July 25, 1966
[45] Patented Nov. 17, 1970
[73] Assignee Sky Center Corporation
   Stockton, California
   a corporation of California

[54] OIL FILTER ADAPTER
   1 Claim, 4 Drawing Figs.
[52] U.S. Cl. .................................................... 210/232
[51] Int. Cl. .................................................... B01d 35/14
[50] Field of Search .......................................... 210/232,
   433, 434, 132, T.O. Digest 133, 136, 440, 443,
   PF-FF Digest 168, 240, 541, 542, 251, 340;
   123/196; 55/350, 418, 419, 420, 484

[56] References Cited
   UNITED STATES PATENTS
2,894,630 7/1959 Humbert, Jr .................. 210/171X
2,979,160 4/1961 Haas ............................ 210/340X
3,021,955 2/1962 Joyce ........................... 210/132
3,066,803 12/1962 Seils ............................ 210/443X
3,087,582 4/1963 Potter .......................... 210/168X
3,184,062 5/1965 Humbert, Jr .................. 210/130
3,250,242 5/1966 Pekarek ........................ 116/70
3,295,507 1/1967 Carter et al. .................. 123/196
3,300,049 1/1967 Hardcastle .................... 210/232
3,367,507 2/1968 Hultgren ...................... 210/434
   FOREIGN PATENTS
335,693 10/1930 Great Britain ................. 210/440
551,531 2/1943 Great Britain ................. 210/168

Primary Examiner—Reuben Friedman
Assistant Examiner—T. A. Granger
Attorney—Boyken, Mohler, Foster & Schwab ABSTRACT: An adapter constructed to be conveniently fitted into the path of flow of an engine-lubricating system having in said path a full flow lubricant filter which adapter will direct away from said path a limited amount of said lubricant for filtration by a limited flow, bypass type lubricant filter while the remainder of the flow is allowed to pass through said full-flow filter.

Patented Nov. 17, 1970
3,540,594
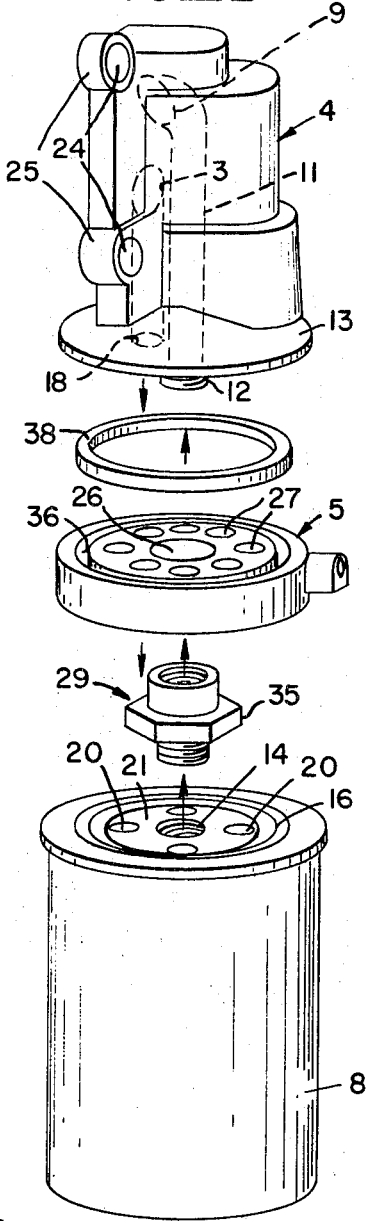
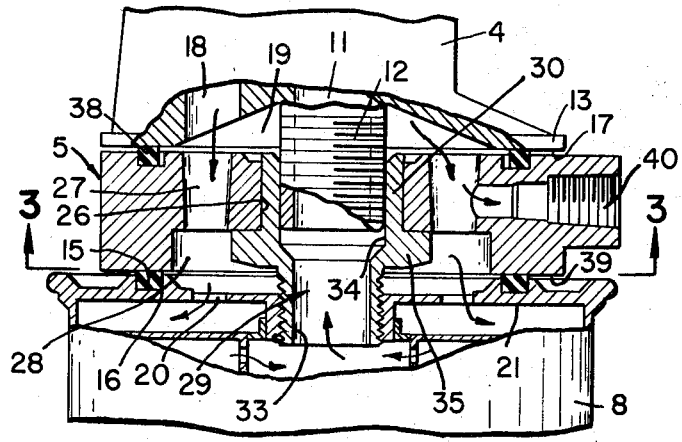
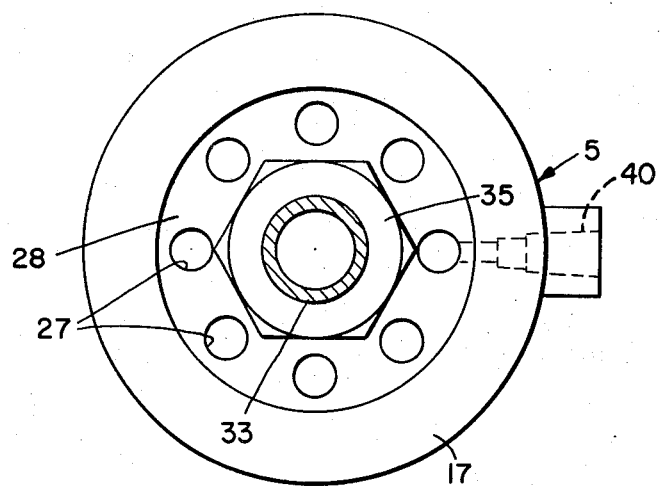
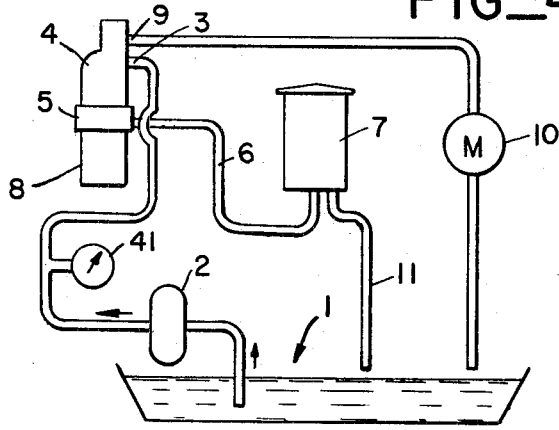
INVENTOR.
JOSEPH D. SANDERSON
BY
Bayken, Mohler, Foster
+ Schlemmer
ATTORNEYS

OIL FILTER ADAPTER

This invention relates to an improvement in an oil-filtering system and more specifically in the oil system in internal combustion engines.

One of the objects of the invention is the provision of means adapted for use in combination with a full-flow filter for continuously bypassing a minor percentage of the oil in the oil system and removing solids therefrom that will not be removed in passing through the full-flow filter, and thereafter mixing said percentage of the oil after it is so purified with the remaining oil in the system for recycling therewith, whereby the efficient circulation of the oil in the system will not be impaired and all the oil in the system will be free from objectionable solids.

Another object of the invention is the provision of means adapted for use with a standard full-flow oil filter in an oil-circulating system, without modifying the said filter in any manner for bypassing a minor percentage of the oil adapted to pass through said filter and which means is adapted to be connected with a conduit for returning the bypassed oil to the system.

A still further object is the provision of an adapter for use with a conventional full-flow oil filter to more efficiently bypass a percentage of the oil in the oil line to a bypass filter for progressively removing solids from the oil in the oil system, whereby all of the oil is purified to a degree impossible with the conventional full-flow filter.

Conventional full-flow oil filters for use in the oil systems for internal combustion engines, particularly automobile engines, are designed to pass the oil, under pressure, at the rate of approximately 10 to 15 quarts a minute. In order to accomplish this result, the efficiency of the filter for filtering out small particles is reduced.

In copending U.S. Pat. application U.S. Ser. No. 270,288, filed April 3, 1963 by S. K. Yee et al., now U.S. Pat. No. 3,308,956, an example of a bypass filter is shown that is adapted to be used in the present invention for installation in combination with a full-flow filter with the minimum of trouble and expense, and which bypass filter, when so installed, efficiently removes the solids and impurities that the full-flow filter is incapable of removing. Such removal is accomplished without reducing the rate of flow of the oil in the system.

Other objects and advantages will appear in the description and in the drawings.

In the drawings, FIG. 1 is exploded isometric view of a conventional filter and elements of the adapter of the present invention that enable the bypassing of oil to be purified.

FIG. 2 is an enlarged, fragmentary, cross-sectional view of parts of the present invention, assembled with a conventional filter.

FIG. 3 is a cross-sectional view taken along line 3–3 of FIG. 2.

FIG. 4 is a diagrammatic view of the oil system incorporating the present invention.

The present system as a whole is shown in FIG. 4, in which oil from a source 1, which may be the crankcase of an internal combustion engine, is withdrawn therefrom by a gear pump 2, or any other suitable pump, and is pumped under pressure to the inlet port 3 of a conventional oil receiving block 4.

From block 4 the oil is conducted into an adapter 5 of the present invention, where a relatively small amount, such as approximately 10 percent of the oil, is bypassed through a line 6 to a filter container 7 where the small solids that cannot be removed by the full-flow filter, will be filtered out. The purified oil then passes to the source 1 where it is mixed with the oil therein, for recirculation.

The oil in the adapter 5 that is not bypassed to filter 7 is conducted through the filter material in a full-flow filter 8 and back through adapter 5 and block 4 to outlet 9 where it is conducted to engine 10 and from engine 10 back to the source 1.

The description of a conventional system in which the block 4 and full-flow filter 8 are parts, will be explained in connection with FIGS. 1 and 2, to not only clearly distinguish between the two systems, but to clearly show the ease with which the conventional system may be converted.

The block 4 is not changed in the new system, and said block includes a central passageway 11, having a downwardly projecting externally threaded nipple 12 positioned at its lower end centrally relative to a circular base 13, and the full-flow filter housing 8 includes a circular head formed with a central outlet opening 14 therein around which is an annular upwardly opening channel or groove 15 (FIG. 2) in which is fitted an annular, resilient, oil-resistant sealing ring 16.

In the conventional assembly, the nipple 12 is threadedly secured in outlet 14 and the sealing ring 16 engages the annular, flat, lower surface 17 of base 13 around the marginal portion thereof, in sealing relation therewith.

In the above-described assembly, all of the oil from pump 2 would pass into inlet 3 of block 4 and downwardly in the latter through a passageway 18 that is alongside a central passageway and outwardly of the latter and into a chamber 19, which chamber is formed by centrally recessing the lower end of block 4 around nipple 12. From chamber 19 the oil would pass through an annular row of openings 20 disposed around outlet 14, which openings are formed in the depressed head 21 of the full-flow filter casing 8.

After passing through openings 20 into the full-flow filter casing 8, the oil passes through the filter material in the latter, and then to outlet 14 and through nipple 12 to outlet 9, and from thence to engine 10 and back to source 1.

Block 4 in the form shown is provided with openings 24 in lugs 25 for bolting it to the engine block or directly to the pressure side of pump 2.

None of the foregoing described structure of the block 4 and full-flow filter requires modification for the installation of the present invention and for forming the present system.

In the present invention, the adapter 5 is inserted between block 4 and the full-flow filter 8, which adapter comprises a generally disclike circular body formed with a central opening 26 coaxial with base 4. An annular row of spaced vertical passageways 27 around opening 26 (FIGS. 2,3) extend through body 5; and the sidewalls of these passageways may be tapered for casting purposes.

The lower side of body 5 is formed with a downwardly opening central circular recess 28, into which the lower ends of passageways 27 open.

A vertically disposed open-ended tubular fitting 29 has an upper end portion 30 that fits within the opening 26 in the body 5, and this fitting includes an externally threaded lower end portion 33 that corresponds in exterior and interior dimensions, and in length, to nipple 12 of block 4 that is adapted to be threaded into outlet 14 in the head of the full-flow filter housing.

The bore through the tubular fitting 29 is counterbored at 34 above the portion 33 that corresponds to nipple 12 and is interiorly threaded to threadedly receive the nipple 12.

A radially outwardly projecting flange 35 is integral with the fitting 29 and is positioned at approximately the level of the lower end of counterbore 34. This flange is polysided around its periphery (FIG. 3) to provide for engagement with the jaws of a wrench for screwing the fitting onto nipple 12 or into the outlet 14, and the flange abuts the lower portion of body 5 around its central opening 26 when the assembly is made up.

The upper surface of body 5 is flat and is formed with an upwardly opening annular groove 36 for receiving a circular sealing ring 38 corresponding to ring 16, so as to provide a seal between the adapter and the surface 17 of base 13. When the full-flow filter housing 8 is secured to fitting 29, the sealing ring 16 will tightly engage the lower flat surface 39 of the body 5.

A laterally opening internally threaded outlet passageway 40 extends into body 5 and communicates at its inner open end with one of the passageways 27. This passageway 40 provides an outlet for passage of oil to the bypass filter 7 for passage of the oil so bypassed through the filter material in the bypass filter container, and then to the source 1.

The head 21 of the full-flow filter housing is formed with a plurality of openings 20 spaced around outlet 14 for the oil from passageways 27. The oil so moved through openings 20 will pass through the filter material within the full-flow filter and then through outlet 14 and the bore of the tubular fitting 29 and nipple 12 to the outlet 9 for passage to engine 10.

If desired, a pressure gauge 41 may be installed in the oil line between the pump 2 and the filter assembly.

In operation, it is seen that the oil passing to the engine from source 1 will, from the commencement of operation of the engine 10 and pump 2, have most of the larger solids removed therefrom, and also the step of progressively removing the smaller particles will commence, without obstructing the adequate flow of oil to the engine. Complete purification of all of the oil, insofar as solids are concerned, is rapid and thereafter only such purified oil will pass through the full-flow filter.

Of importance is the structure enabling a quick installation of the adapter 5 without eliminating or modifying the standard full-flow filter elements 4 and 8, and without cutting or modifying the oil lines leading to and from said elements. It is merely necessary to connect the line in which the bypass filter is connected, with the outlet 40 of the adapter 5. The filter indicated at 7 may be one substantially corresponding to the one shown in the copending application hereinbefore mentioned, in which provision is made for securing it in any suitable position.

In its broadest aspect, the adapter itself may be said to be a body providing a pair of passageways therethrough, respectively adapted to pass oil from the inlet passageway 18 in block 4 to an inlet 20 in said full-flow filter housing, and to pass oil from the outlet 14 of the latter to the outlet passageway 11 and back to the oil line leading to the engine, and means 40 is provided in said body for connecting an oil line having a bypass filter therein with one of the passageways of said pair for conducting a portion only of the oil in said one of said passageways to said bypass filter.

While the structure illustrated is the preferred form, it is clear that, provided the ratio of oil passed to the bypass filter is approximately retained, the oil in the system would be purified whether it was taken from the passageway leading into the full-flow filter or in the passageway leading from the full-flow filter.

It is to be understood that the foregoing detailed description is not intended to limit the invention, since changes and modifications may occur to those skilled in the art which do not depart from the spirit of the invention and which come within the scope of the appended claims.

I claim:

1. In combination with an engine-lubricating system, an adapter for connecting a bypass filter in an oil pressure line that includes a full-flow filter housing having a first inlet and a first outlet for passage of oil to and from filter material within said housing, and a block having a second inlet and a second outlet therein for respectively conducting oil in said line to said first inlet and away from said first outlet back into said line, said adapter comprising:

a. a body separable from said housing and said block having:
      1. plurality of first passageways therethrough respectively communicating with for passing oil from said second inlet in said block to said first inlet in said full-flow filter and
      2. a second passageway therethrough respectively communicating with for passing oil from said first outlet of said housing to said second outlet when said body is interposed between said block and said housing;
   b. means for connecting an oil line having a bypass filter therein with one of said plurality of first passageways for conducting a portion only of the oil in said one of said first passageways to said bypass filter;
   c. said first passageways being disposed annularly of said body and said second passageway being disposed centrally within said body;
   d. said body providing a fitting having threaded portions at opposite ends of said second passageway to respectively connect said body to the standard connections on said block and housing when said body is interposed therebetween; and
   e. the capacity of said plurality of first passageways to passage of oil therethrough from said second inlet to said first inlet in said housing being such that approximately only 10 percent of the oil passing therethrough will be diverted from said one of said first passageways to said bypass filter.